(12) United States Patent
Wang et al.

(10) Patent No.: US 12,535,776 B2
(45) Date of Patent: Jan. 27, 2026

(54) LONG-BASELINE REAL-TIME TIME TRANSFER METHOD BASED ON UNDIFFERENCED AND UNCOMBINED PPP-RTK

(71) Applicant: National Time Service Center, Chinese Academy of Sciences, Xi'an (CN)

(72) Inventors: Kan Wang, Xi'an (CN); Baoqi Sun, Xi'an (CN); Xuhai Yang, Xi'an (CN)

(73) Assignee: National Time Service Center, Chinese Academy of Sciences, Xi'an (CN)

( * ) Notice: Subject to any disclaimer, the term of this patent is extended or adjusted under 35 U.S.C. 154(b) by 419 days.

(21) Appl. No.: 18/106,880

(22) Filed: Feb. 7, 2023

(65) Prior Publication Data

US 2024/0094681 A1    Mar. 21, 2024

(30) Foreign Application Priority Data

Sep. 20, 2022    (CN) .......................... 202211142733.X

(51) Int. Cl.
G04R 20/02    (2013.01)
(52) U.S. Cl.
CPC .................................. G04R 20/02 (2013.01)
(58) Field of Classification Search
CPC .................... G04R 20/02; G01S 19/23–235
See application file for complete search history.

(56) References Cited

U.S. PATENT DOCUMENTS 11,156,724 B2 * 10/2021 Kishimoto ............. G01S 19/071
11,681,050 B2 *  6/2023 Grgich .................... G01S 19/44
                                                              342/357.62

(Continued)

FOREIGN PATENT DOCUMENTS

WO    WO-2023050760 A1 *  4/2023 ............. G01S 19/07

OTHER PUBLICATIONS

Dennis Odijk, Peter J. G. Teunissen et al., "On the estimability of parameters in undifferenced, uncombined GNSS network and PPP-RTK user models by means of S-system theory", Springer, Nov. 5, 2015, 31 pages in total.

*Primary Examiner* — Vladimir Magloire
*Assistant Examiner* — Kimberly Jenkins
(74) *Attorney, Agent, or Firm* — Zhigang Ma

(57) ABSTRACT

A time transfer method based on undifferenced and uncombined PPP-RTK is applied to a time transfer system including a PPP-RTK network end observation station network and PPP-RTK user end observation stations. The network end observation station network includes GNSS reference stations and a network data processing center. The user end observation stations include a time reference station and an ordinary user station. The method includes: acquiring GNSS observations collected by the GNSS reference stations and performing an undifferenced and uncombined PPP-RTK resolution to generate network end products; each of the user end observation stations performing an undifferenced and uncombined PPP-RTK resolution by using collected GNSS observations and the network end product to generate multi-GNSS receiver clock biases; and solving a combined inter-station clock bias by using the receiver clock biases of the ordinary user end observation stations and those of the time reference station serving also as user end.

9 Claims, 2 Drawing Sheets

(56) References Cited

U.S. PATENT DOCUMENTS

| | | | |
|---|---|---|---|
| 2021/0033735 A1* | 2/2021 | Kleeman | G01S 19/07 |
| 2021/0239851 A1* | 8/2021 | Gao | G01C 15/06 |
| 2024/0012158 A1* | 1/2024 | Kee | G01S 19/47 |
| 2024/0210567 A1* | 6/2024 | Saxon | G01S 5/009 |
| 2024/0361769 A1* | 10/2024 | Hundley | G01S 19/23 |
| 2024/0421474 A1* | 12/2024 | van Diggelen | H01Q 1/241 |
| 2025/0052908 A1* | 2/2025 | Kato | G01S 19/23 |
| 2025/0123404 A1* | 4/2025 | Bamberg | G01S 19/21 |

* cited by examiner the network data processing center acquiring GNSS observations collected by the GNSS reference stations, performing a network end undifferenced and uncombined PPP-RTK resolution on the GNSS observations to generate a network end product, and broadcasting the network end product to the PPP-RTK user end observation stations; wherein the GNSS observations comprise carrier phase and pseudo-range observations, and the network end product comprises estimated satellite clock bias and satellite phase bias related products ~S1 the high-precision time reference station using GNSS observations collected by itself and the network end product to perform a high-precision time reference station end undifferenced and uncombined PPP-RTK resolution and thereby generate multi-GNSS receiver clock biases of the high-precision time reference station, and broadcasting the multi-GNSS receiver clock biases of the high-precision time reference station to the ordinary user station ~S2 the ordinary user station using GNSS observations collected by itself and the network end product to perform an ordinary user station end undifferenced and uncombined PPP-RTK resolution and thereby generate multi-GNSS receiver clock biases of the ordinary user station, and solving a combined inter-station clock bias between the ordinary user station and the high-precision time reference station under a combination of multiple GNSSs by using the multi-GNSS receiver clock biases of the ordinary user station and the multi-GNSS receiver clock biases of the high-precision time reference station, for time transfer ~S3

FIG. 1

LONG-BASELINE REAL-TIME TIME TRANSFER METHOD BASED ON UNDIFFERENCED AND UNCOMBINED PPP-RTK

TECHNICAL FIELD

The disclosure relates to the field of time service and time transfer, particularly to a time transfer method based on undifferenced and uncombined PPP-RTK.

BACKGROUND

In many present-day fields of people's livelihood and science and technology, the precision of time is the premise and guarantee of their benign and safe operations. A precise time transfer carried out by the global navigation satellite systems (GNSSs) ensures precision, high coverage and real-time performance of time transfer under a simple requirement to external hardware support. GNSS uses its high-precision carrier phase and code pseudo-range signals to solve receiver clock bias parameters while meeting user's positioning needs. Depending on GNSS signals received by two ends, i.e., a high-stability time reference station and a user, an inter-station clock bias can be solved to achieve the purpose of high-precision time transfer.

With increasing fields of precision-time demand and types of users, the concept of time transfer is no longer limited to a traditional post-processing time transfer between high-precision time laboratories. Its demand is also expanding toward real-time and dynamic fields. In this expansion, the GNSS method suitable for real-time dynamic users again highlights its advantages. Its flexible algorithm also provides a variety of possibilities for real-time high-precision time transfer of different lengths of baselines.

Existing time service means mainly include the precise point positioning (shorted as PPP) method and the real-time kinematic (shorted as RTK) method, also called as the phase-based common-view method. The PPP method is used to solve receiver clock biases of a time reference station and a user, and then an inter-station clock bias is obtained by performing a difference operation on the estimated results, which is a current general means for precise time transfer of long-baseline (herein, long-baseline refers to a length greater than five hundred kilometers). For post-processing time transfer, the PPP method can use high-precision GNSS satellite final orbits and clock products provided by various research institutions, such as the international GNSS service (IGS). Receiver clock biases can be solved with a batch least-squares adjustment, with a between-receiver difference operation performed afterward. For real-time time transfer, by using real-time GNSS satellite orbits and clock products provided by various institutions, receiver clock biases can also be solved based on Kalman filtering, with a between-receiver difference operation performed afterward. Different from the PPP, the time transfer of RTK method is directly performed with a difference operation at the observation level, and a clock bias between two stations is solved. Compared with the PPP method, the RTK time transfer eliminates the GNSS satellite clock bias and a considerable part of GNSS orbital errors through the difference operation, reduces the demand to external input products, and thus provides good conditions for real-time time transfer of short-baselines.

However, the PPP method based on the high-precision GNSS satellite final products and the batch least-squares adjustment is suitable for the post-processing time transfer, which is difficult to meet the needs of real-time users. For a user of real-time PPP, the time transfer result is strongly dependent on external real-time precise satellite clock and orbit products. The qualities of the real-time GNSS satellite orbit and clock products, and the continuity of the satellite clock products are very important for a stable result of time transfer. Although the time transfer based on the RTK method reduces the demand for external GNSS products, it is limited by the baseline length. For long baselines, the RTK method cannot eliminate tropospheric and ionospheric delays through the between-receiver differencing. The atmospheric delays can only be reduced, or even need to be estimated. This increases the mis-modeled biases or weakens the strength of the model. Meanwhile, with the increasing baseline length, the number of common-view satellites between two stations gradually decreases, which will also weaken the observation model. In addition, the RTK method needs to transfer original observations rather than satellite-related products to users, which increases the pressure on data transmission. In the case of data loss or delay, compared to the satellite-related products, it is difficult to predict the original observations.

Therefore, effectively realizing a long-baseline real-time high-precision time transfer is an urgent problem to be solved in the field.

SUMMARY

In order to solve the problem in the prior art, an embodiment of the disclosure provides a long-baseline real-time time transfer method based on undifferenced and uncombined precise point positioning—real-time kinematic positioning (PPP-RTK), applied in a pre-established time transfer system, wherein the time transfer system includes the PPP-RTK network end observation station network, and the PPP-RTK user end observation stations. The PPP-RTK network end observation station network (abbreviated as network end) has a service range of more than five hundred kilometers and includes GNSS reference stations and a network data processing center, and the PPP-RTK user end observation stations include a high-precision time reference station and an ordinary user station. The time transfer method includes:

the network data processing center acquiring GNSS observations collected by the GNSS reference stations, performing a network end undifferenced and uncombined PPP-RTK resolution on the GNSS observations to generate a network end product, and broadcasting the network end product to the PPP-RTK user end observation stations; wherein the GNSS observations include the carrier phase and pseudo-range observations, and the network end product includes estimated satellite clock bias and satellite phase bias related products;

the high-precision time reference station using GNSS observations collected by itself and the network end product to perform a high-precision time reference station end undifferenced and uncombined PPP-RTK resolution and thereby generate multi-GNSS receiver clock biases of the high-precision time reference station, and broadcasting the multi-GNSS receiver clock biases of the high-precision time reference station to the ordinary user station; and the ordinary user station using GNSS observations collected by itself and the network end product to perform an ordinary user station end undifferenced and uncombined PPP-RTK resolution and thereby generate multi- GNSS receiver clock biases of the ordinary user station, and solving a combined inter-station clock bias between the ordinary user station and the high-precision time reference station under a combination of multiple GNSSs by using the multi-GNSS receiver clock biases of the ordinary user station and the multi-GNSS receiver clock biases of the high-precision time reference station, for time transfer.

In an embodiment of the disclosure, a process of performing a network end undifferenced and uncombined PPP-RTK resolution on the GNSS observations to generate a network end product includes:
  obtaining network end undifferenced and uncombined original observation equations according to the GNSS observations as acquired;
  selecting appropriate singularity-basis (S-basis) parameters according to a singularity-system (S-system) theory to recombine unknown parameters in the network end undifferenced and uncombined original observation equations to avoid rank deficiencies among parameters and thereby obtain network end undifferenced and uncombined observation equations with recombined parameters, and determining a network end covariance matrix of GNSS observations of the current epoch;
  based on a pre-established time constraint model of network end, and network end parameters containing time constraint model solved at a preceding epoch and their covariance matrix, determining updated network end parameters containing time constraint model and their covariance matrix; and
  solving the network end product of a corresponding epoch, according to the network end undifferenced and uncombined observation equations with recombined parameters, the network end covariance matrix of GNSS observations of current epoch, and the updated network end parameters containing time constraint model and their covariance matrix.

In an embodiment of the disclosure, the network end product includes: for each satellite, a resolved satellite clock bias and its linear and quadratic terms, and a resolved satellite phase bias.

In an embodiment of the disclosure, the network end product further includes, for each satellite, a satellite code bias when using GNSS observations of three frequencies or more than three frequencies.

In an embodiment of the disclosure, the high-precision time reference station using GNSS observations collected by itself and the network end product to perform a high-precision time reference station end undifferenced and uncombined PPP-RTK resolution and thereby generate a multi-GNSS receiver clock bias of the high-precision time reference station includes:
  based on the network end product and a corresponding network end product reference time, the high-precision time reference station obtaining an estimated or a predicted result for a network end transferred satellite-related correction;
  obtaining high-precision time reference station end undifferenced and uncombined observation equations at the network end product reference time or a processing time according to the estimated or predicted result for the network end transferred satellite-related correction obtained by the high-precision time reference station, and determining a high-precision time reference station end covariance matrix of GNSS observations at the network end product reference time or the processing time;
  based on a pre-established time constraint model of high-precision time reference station end, and high-precision time reference station end parameters containing time constraint model solved at a preceding epoch and their covariance matrix, determining updated high-precision time reference station end parameters containing time constraint model and their covariance matrix; and
  solving the multi-GNSS receiver clock biases of the high-precision time reference station, according to the high-precision time reference station end undifferenced and uncombined observation equations at the network end product reference time or the processing time, the high-precision time reference station end covariance matrix of GNSS observations at the network end product reference time or the processing time, and the updated high-precision time reference station end parameters containing time constraint model and their covariance matrix.

In an embodiment of the disclosure, the ordinary user station using GNSS observations collected by itself and the network end product to perform an ordinary user station end undifferenced and uncombined PPP-RTK resolution and thereby generate multi-GNSS receiver clock biases of the ordinary user station includes:
  based on the network end product and the corresponding network end product reference time, the ordinary user station obtaining an estimated or a predicted result for the network end transferred satellite-related correction;
  obtaining ordinary user station end undifferenced and uncombined observation equations at the network end product reference time or the processing time according to the estimated or predicted result for the network end transferred satellite-related correction obtained by the ordinary user station, and a motion mode and a coordinate state of the ordinary user station, and determining an ordinary user station end covariance matrix of GNSS observations at the network end product reference time or the processing time;
  based on a pre-established time constraint model of ordinary user station end, and ordinary user station end parameters containing time constraint model solved at the preceding epoch and their covariance matrix, determining updated ordinary user station end parameters containing time constraint model and their covariance matrix; and
  solving the multi-GNSS receiver clock biases of the ordinary user station, according to the ordinary user station end undifferenced and uncombined observation equations at the network end product reference time or the processing time, the ordinary user station end covariance matrix of GNSS observations at the network end product reference time or the processing time, and the updated ordinary user station end parameters containing time constraint model and their covariance matrix.

In an embodiment of the disclosure, the obtaining ordinary user station end undifferenced and uncombined observation equations at the network end product reference time or the processing time according to the estimated or predicted result for the network end transferred satellite-related correction obtained by the ordinary user station, and a motion mode and a coordinate state of the ordinary user station includes:

fixing coordinates of the ordinary user station and not performing a solving operation when the ordinary user station is in a static mode and the coordinates are known, and obtaining, as per an equation form of undifferenced and uncombined observation equations of the high-precision time reference station, first type of equations as the ordinary user station end undifferenced and uncombined observation equations at the network end product reference time or the processing time, wherein the high-precision time reference station end undifferenced and uncombined observation equations at the network end product reference time or the processing time are referred to as the undifferenced and uncombined observation equations of the high-precision time reference station for short;

statically solving the coordinates of the ordinary user station when the ordinary user station is in the static mode and the coordinates are unknown, and obtaining, on the basis of the equation form of the undifferenced and uncombined observation equations of the high-precision time reference station, second type of equations as the ordinary user station end undifferenced and uncombined observation equations at the network end product reference time or the processing time;

dynamically solving the coordinates of the ordinary user station when the ordinary user station is in a dynamic mode and the coordinates are unknown, and obtaining the second type of equations as the ordinary user station end undifferenced and uncombined observation equations at the network end product reference time or the processing time.

In an embodiment of the disclosure, a method of obtaining corresponding estimated results in processes of the network end undifferenced and uncombined PPP-RTK resolution, the high-precision time reference station end undifferenced and uncombined PPP-RTK resolution and the ordinary user station end undifferenced and uncombined PPP-RTK resolution includes:

solving epoch by epoch using a sequential least-squares adjustment.

In an embodiment of the disclosure, after solving epoch by epoch using the sequential least-squares adjustment to solve results of parameters, the time transfer method further includes:

resolving integer ambiguities by using a preset algorithm, and obtaining a resolution result under an integer ambiguity resolution enabled (IAR-enabled) mode.

In an embodiment of the disclosure, the solving a combined inter-station clock bias between the ordinary user station and the high-precision time reference station under a combination of multiple GNSSs by using the multi-GNSS receiver clock biases of the ordinary user station and the multi-GNSS receiver clock biases of the high-precision time reference station includes:

for each of the multiple GNSSs, performing a difference operation on a receiver clock bias of the ordinary user station corresponding to the GNSS and a receiver clock bias of the high-precision time reference station corresponding to the GNSS to obtain an inter-station clock bias corresponding to the GNSS; and combining the inter-station clock biases corresponding to the multiple GNSSs by using weighting factors of the multiple GNSSs, to obtain the combined inter-station clock bias.

Beneficial effects achieved by embodiments of the disclosure may be as follows:

embodiments of the disclosure use an undifferenced and uncombined PPP-RTK mode, combine the advantages of PPP and RTK time transfers, overcomes respective disadvantages of PPP and RTK time transfers, and thus provides a new solution and method for the long-baseline real-time high-precision time transfer. The undifferenced and uncombined PPP-RTK employed by the embodiments of the disclosure can construct a regional ground station network in a range of hundreds of kilometers or even more than a thousand of kilometers, and a difference operation is not used to eliminate parameters, so that the time transfer is suitable for long baselines. Compared with the traditional PPP mode, the network end of the embodiments of the disclosure generates by itself a network end product by resolving, namely generates satellite clock bias and satellite phase bias products, and does not depend on an input of an external high-frequency high-precision satellite clock product, the embodiments of the disclosure merely need a relatively precise orbit and can obtain the network end product by short-term prediction of the precise orbit. Moreover, the PPP-RTK method disclosed by the embodiments of the disclosure solves various atmospheric delay parameters independently in an undifferenced and uncombined model, and can deploy a certain number of GNSS reference stations within a range of around a thousand of kilometers, and thus is more suitable for long-baseline than the RTK time transfer method. In addition, compared with RTK, according to the embodiments of the disclosure, what are transferred to the high-precision time reference station and the ordinary user station are the satellite-related product rather than observations themselves, so that the data transmission pressure is relieved, and the prediction under a product delay is facilitated. Therefore, compared with the prior art, the embodiments of the disclosure can effectively realize a long-baseline real-time high-precision time transfer.

Furthermore, in the embodiments of the disclosure, the high-precision time reference station is used as one of user stations, and a difference operation is performed on the receiver clock biases of the high-precision time reference station and the ordinary user station, so that the influence brought by the network end product can be partially eliminated, and the stability of time transfer is improved. In addition, the combination of the inter-station clock biases among systems under the condition of multiple GNSSs can realize the effect of stabilities of the clock bias results being complementary to each other.

BRIEF DESCRIPTION OF THE DRAWINGS

FIG. 1 illustrates a schematic flowchart of a long-baseline real-time time transfer method based on undifferenced and uncombined PPP-RTK according to an embodiment of the disclosure.

DETAILED DESCRIPTION OF EMBODIMENTS

Figure 2:
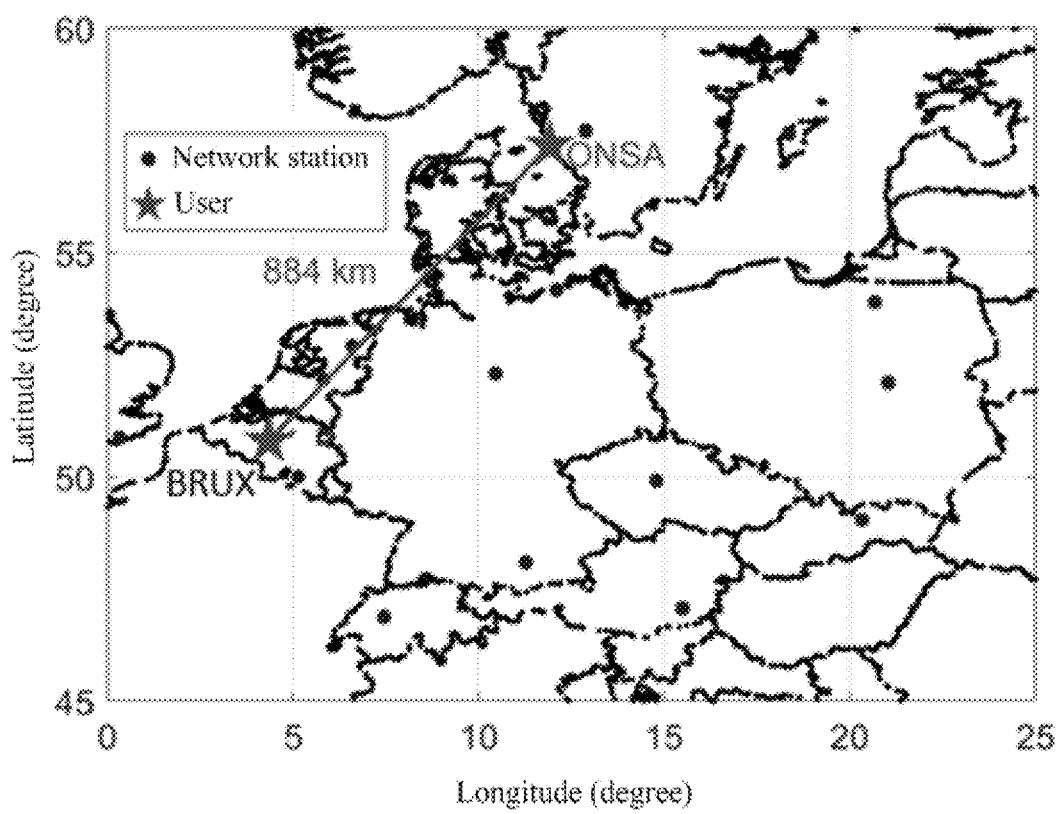
FIG. 2 illustrates a schematic distribution of a PPP-RTK network end observation station network and PPP-RTK user end observation stations in an experiment according to an embodiment of the disclosure.

In the following, technical solutions of embodiments of the disclosure will be clearly and completely described in conjunction with accompanying drawings of the embodiments of the disclosure. Apparently, the described embodiments are only some embodiments of the disclosure, but not all embodiments of the disclosure. Based on the described embodiments of the disclosure, all other embodiments obtained by those skilled in the art without creative work are within the scope of protection of the disclosure.

In order to overcome defects of existing time service means in the aspect of real-time and high-precision time transfer of long-baseline, an embodiment of the disclosure proposes a long-baseline real-time time transfer method based on undifferenced and uncombined PPP-RTK, which is applied in a pre-constructed time transfer system. The time transfer system includes a PPP-RTK network end observation station network and PPP-RTK user end observation stations. The PPP-RTK network end observation station network has a service range of more than five hundred kilometers, and includes multiple (i.e., more than one) GNSS reference stations and a network data processing center. The PPP-RTK user end observation stations include a high-precision time base station and an ordinary user station.

Observation stations in the PPP-RTK network end observation station network are CORS (continuous operating reference station) reference stations that operate stably, namely GNSS reference stations, which are equipped with professional GNSS antennas and receivers for geodetic survey. The GNSS reference stations are configured (i.e., structured and arranged) to collect GNSS observations and deliver them to the network data processing center in real time. The network data processing center includes a device with computing and data transmission capabilities, such as a computer. The high-precision time reference station is, for example, a CORS station connected to a high-stability hydrogen maser, and uses a fixed mode. The ordinary user station can use a fixed mode, a static mode, or a dynamic mode. The fixed mode represents that user coordinates are fixed and known, the static mode represents that user coordinates are fixed and unknown, and the dynamic mode represents that user coordinates are variable and unknown. For ease of understanding, the PPP-RTK network end observation station network may be referred to as network end for short, the GNSS reference stations may be referred to as network stations for short, the PPP-RTK user end observation stations may be referred to as user end for short, and the high-precision time reference station and the ordinary user station may be referred to as user stations for short. Moreover, it should be noted that, the GNSS reference stations and the PPP-RTK user end observation stations in an illustrated embodiment of the disclosure each employ multi-frequency and multi-GNSS receivers, where the multi-frequency represents multiple frequency bands, and the multi-GNSS represents acquiring signals through multiple different GNSSs, for example, observations from the GPS (global positioning system) and the Galileo satellite navigation system are collected by the stations. "undifferenced" in the term of undifferenced and uncombined means that not performing a difference operation between receivers or between satellites for parameter elimination, and "uncombined" means that not performing a combining operation for parameter elimination, and as for their specific meanings, please understand in the following text in combination with specific steps.

Referring to FIG. 1, a long-baseline real-time time transfer method based on undifferenced and uncombined PPP-RTK according to an embodiment of the disclosure may include the following steps S1~S3.

S1, the network data processing center acquiring GNSS observations collected by the GNSS reference stations, performing a network end undifferenced and uncombined PPP-RTK resolution on the acquired GNSS observations to generate a network end product, and broadcasting the network end product to the PPP-RTK user end observation stations.

The main task of the network data processing center is to acquire the GNSS observations collected by the GNSS reference stations in real-time, and specifically, the GNSS observations collected by the GNSS reference stations can be acquired with a given sampling interval, for example, once per second, as an input data of an epoch corresponding to the acquiring time. By using the input data obtained for each epoch, under the condition of multi-frequency and multi-GNSS, undifferenced and uncombined PPP-RTK network end observation equations are solved to generate a network end product corresponding to the epoch. GNSS observations includes carrier phase and pseudo-range (or called as code) observations. The network end product includes resolved satellite clock biases and satellite phase bias-related products.

It should be noted that, for the PPP-RTK user end observation stations in the subsequent steps, the way of acquiring GNSS observations is similar to the way that the network data processing center acquires the GNSS observations collected by the GNSS reference stations in real-time, and thus will not be described in detail later.

In an embodiment, performing a network end undifferenced and uncombined PPP-RTK resolution on the acquired GNSS observations to generate a network end product, includes the following sub-steps S11~S14.

S11, obtaining network end undifferenced and uncombined original observation equations according to the acquired GNSS observations.

In particular, according to differences (observed-minus-computed term, shorted as O-C term) between multi-frequency and multi-GNSS carrier phase and pseudo-range observations and computed values of corresponding models, the network end undifferenced and uncombined original observation equations are obtained as shown in formulas (1) and (2):

$$E(\Delta\varphi_{r,j}^s)=g_r^s\Delta\tau_r+dt_r-dt^s-\mu_j\iota_r^s+\delta_{r,j,g}-\delta_j^s+\lambda_j N_{r,j}^s \quad (1)$$

$$E(\Delta p_{r,j}^s)=g_r^s\Delta\tau_r+dt_r-dt^s+\mu_j\iota_r^s+d_{r,j,g}-d_j^s \quad (2)$$

For a specific construction process of the network end undifferenced and uncombined original observation equations, please refer to the relevant technology for understanding, and thus will not be described in detail herein.

In formulas (1) and (2), E(•) represents the expectation operator, the superscript s represents satellite s, and the subscripts r, j, g represent receiver r, frequency j and GNSS g respectively. $\Delta\varphi_{r,j}^s$ represents a network end O-C term, $\Delta p_{r,j}^s$ represents another network end O-C term, $g_r^s$ represents the mapping function that the zenith tropospheric delay $\Delta\tau_r$ projected to the signal direction, $dt_r$ represents the network end receiver clock bias, $dt^s$ represents the satellite clock bias, $dt_r$ and $dt^s$ are both in unit of range, such as meter. $\iota_r^s$ it represents the ionospheric delay on the first frequency band of the network station, $\mu_j=f_1^2/f_j^2$ represents the factor expanding $\iota_r^s$ to the frequency j, $f_1$ represents the first frequency in the corresponding GNSS, $f_j$ represents the jth frequency in the corresponding GNSS, j is a natural number greater than 0. $\delta_{r,j,g}$ represents the carrier-phase receiver hardware bias of the network station, $d_{r,j,g}$ represent the code receiver hardware bias of the network station, $\delta_j^s$ represents the satellite phase hardware bias, $d_j^s$; represents the satellite code hardware bias, $N_{r,j}^s$ represents an integer ambiguity of network station, $\lambda_j$ represents the wavelength on the frequency j. It can be understood that, the network end directly introduces a relatively precise GNSS satellite orbit from outside, and thus does not solve the satellite orbit.

It can be understood that, for each GNSS g, the network end undifferenced and uncombined original observation equations shown in the above formulas (1) and (2) may be obtained for the current epoch.

S12, selecting appropriate singularity-basis (S-basis) parameters according to a singularity-system (S-system), recombining unknown parameters in the network end undifferenced and uncombined original observation equations to avoid rank deficiencies among parameters and thereby obtain network end undifferenced and uncombined observation equations with recombined parameters, and determining a network end covariance matrix of GNSS observations of the current epoch.

Since the observation equations represented by formulas (1) and (2) contain rank deficiency, in order to eliminate the rank deficiency, it is necessary to select appropriate S-basis parameters according to the S-system theory, and recombine the unknown parameters in formulas (1) and (2) to obtain the network end undifferenced and uncombined observation equations with recombined parameters, as shown in formulas (3) and (4):

$$E(\Delta\varphi_{r,j}^s) = g_r^s \Delta\tau_r + \tilde{dt}_{r,g} - \tilde{dt}^s - \mu_j \tilde{l}_r^s + \tilde{\delta}_{r,j,g} - \tilde{\delta}_j^s + \lambda_j \tilde{N}_{r,j}^s \quad (3)$$

$$E(\Delta p_{r,j}^s) = g_r^s \Delta\tau_r + \tilde{dt}_{r,g} - \tilde{dt}^s + \mu_j \tilde{l}_r^s + \tilde{d}_{r,j,g} - \tilde{d}_j^s \quad (4)$$

In formulas (3) and (4), parameters with tilde lines above are recombined forms of corresponding parameters in formulas (1) and (2). $\tilde{dt}_{r,g}$ represents a recombined form of $dt_r$ for GNSS g. Specific forms of the parameters of recombined forms in formulas (3) and (4) are related to the number of frequencies and a constraint model of the unknown parameters, and could vary according to situations. For details, please refer to the related prior art of S-system theory, S-basis parameters, etc., for understanding, such as the paper proposed by Dennis Odijk and Peter J. G. Teunissen et al. (titled as "On the estimability of parameters in undifferenced, uncombined GNSS network and PPP-RTK user models by means of S-system theory", published by Springer on Nov. 5, 2015), etc., and thus specific content will not be described in detail herein.

Moreover, according to an embodiment of the disclosure, for the network end undifferenced and uncombined carrier phase and pseudo-range observations, the network end covariance matrix $Q_n$ of GNSS observations of the current epoch can be determined as the following formula (5) based on a specific weighting function related to an elevation angle.

$$Q_n = \begin{pmatrix} Q_{\varphi n} & 0 \\ 0 & Q_{pn} \end{pmatrix} \quad (5)$$

In formula (5), $Q_{\varphi n}$ represents the covariance matrix of network end carrier phase undifferenced and uncombined observation equation, i.e., the covariance matrix for formula (3); $Q_{pn}$ represents the covariance matrix of network end pseudo-range undifferenced and uncombined observation equation, i.e., the covariance matrix for formula (4). $Q_{\varphi n}$ is a diagonal matrix, whose diagonal elements are variances of all carrier phase observation noises, the variance of each observation noise is determined by a given zenith direction carrier phase observation noise variance and the specific weighting function related to the elevation angle. A determination method of $Q_{pn}$ is similar to that of $Q_{\varphi n}$, but a zenith direction observation noise variance correspondingly is a zenith direction variance of pseudo-range observation noise. The specific weighting function related to the elevation angle has various types, and the embodiment of the disclosure can reasonably select as required. It is thus not specifically limited herein.

S13, based on a pre-established time constraint model of network end, and network end parameters containing time constraint model solved at a preceding epoch and a covariance matrix thereof, determining updated network end parameters containing time constraint model and a covariance matrix thereof.

Specifically, network end observation equations for each epoch can be established according to formulas (3)-(5), which means for each epoch, a set of network end observation equations can be obtained as shown in formulas (3)-(5). Afterwards, the time constraint model of network end parameters can be established according to specific situations. The specific situations, for example, include a time constraint of zenith tropospheric delay and a time constraint of hardware delays, the former depends on the variation of temperature, humidity, air pressure and so on; and the latter depends on the quality of hardware itself, ambient temperature change and so on. According to the network end parameters $\Delta\hat{X}_{Dn}(t_{i-1})$ containing time constraint model solved at the preceding epoch and their covariance matrix $Q_{\Delta\hat{X}_{Dn}}(t_{i-1})$, in combination with the time constraint model of network end parameters, the network end parameters containing time constraint model and their covariance matrix can be updated to the current epoch, as shown in the following formulas (6) and (7):

$$E(\Delta\hat{X}_{Dn}(t_{i|i-1})) = \Phi_n(t_{i|i-1}) \cdot \Delta\hat{X}_{Dn}(t_{i-1}) \quad (6)$$

$$Q_{\Delta\hat{X}_{Dn}}(t_{i|i-1}) = \Phi_n(t_{i|i-1}) \cdot Q_{\Delta\hat{X}_{Dn}}(t_{i-1}) \cdot \Phi_n^T(t_{i|i-1}) + S_n \quad (7)$$

In formulas (6) and (7), $\Phi_n(t_{i|i-1})$ represents an inter-epoch transfer function of time constraint of network end parameters, $\Phi_n(t_{i|i-1})$ is the transposition of $\Phi_n(t_{i|i-1})$. $S_n$ represents the covariance matrix of time constraint system noises among network end parameters. $\Phi_n(t_{i|i-1})$ and $S_n$ are obtained according to the pre-established time constraint model of network end parameters. $\Delta\hat{X}_{Dn}(t_{i-1})$ represents the part with time constraints in the unknown parameters solved at the time $t_{i-1}$ of network end, that is, the network end parameters containing time constraint model solved at the preceding epoch. $\Delta\hat{X}_{Dn}(t_{i|i-1})$ represents $\Delta\hat{X}_{Dn}$ at the network end being updated to the time $t_i$. $Q_{\Delta\hat{X}_{Dn}}(t_{i-1})$ represents the covariance matrix of $\Delta\hat{X}_{Dn}$ solved at the time $t_{i-1}$ at the network end, $Q_{\Delta\hat{X}_{Dn}}(t_{i|i-1})$ represents $Q_{\Delta\hat{X}_{Dn}}$ of the network end being updated to the time $t_i$. Network end parameters with inter-epoch time constraint usually are $\Delta\tau_r$, $\tilde{\delta}_j^s$, $\tilde{d}_j^s$, $\tilde{\delta}_{r,j,g}$, $\tilde{d}_{r,j,g}$, $\tilde{N}_{r,j}^s$, and so on.

It should be noted that, S13 is for each current epoch starting from the second epoch, and there is no time constraint when resolving at the first epoch, and subsequent corresponding steps are similar to this and thus will not be described again.

S14, solving the network end product of a corresponding epoch, according to the network end undifferenced and uncombined observation equations with recombined parameters, the network end covariance matrix of GNSS observations of current epoch, and the updated network end parameters containing time constraint model and the covariance matrix thereof.

The sub-step S14 is a process of performing the network end undifferenced and uncombined PPP-RTK resolution to obtain a corresponding estimated result, and the estimated result is the network end product of the corresponding epoch. Specifically, the sub-step S14 processes the formulas (3) to (7).

A method for obtaining the corresponding estimated result in a process of the network end undifferenced and uncombined PPP-RTK resolution may include: solving epoch-by-epoch using a sequential least-squares adjustment.

Specifically, according to formulas (3)-(7), the sequential least-squares adjustment can be used to solve the network end undifferenced and uncombined PPP-RTK observation equations epoch-by-epoch to thereby obtain the network end product of the corresponding epoch. The specific resolving process can refer to the related prior art for understanding, and thus will not be described in detail herein.

After solving epoch-by-epoch by using the sequential least-squares adjustment to solve results of parameters, in an embodiment, the time transfer method further includes: resolving integer ambiguities by using a preset algorithm, and obtaining a resolution result under an integer ambiguity resolution enabled (IAR-enabled) mode.

In particular, the preset algorithm may be LAMBDA algorithm. In an illustrated embodiment, some or all integer ambiguities $\tilde{N}_{r,j}^s$ are resolved to integers, and are substituted into formulas (3)-(7) to obtain the network end product under the IAR-enabled mode of the corresponding epoch. However, it should be noted that using the preset algorithm to resolve the integer ambiguity is an optional way rather than a necessary step.

In some embodiments of the disclosure, the convergence of solved parameters can be accelerated by correctly resolving the integer ambiguities, so that the estimated result can quickly reach a relatively high precision. However, a possible wrong resolution in the integer ambiguity resolution and different numbers of ambiguities resolved in adjacent epochs may affect the stability of network end correction with which it is highly correlated, thus affecting the solution of the user end. An ambiguity-float resolution requires relatively longer convergence time, but the estimated result has the advantage of continuity, and part of the biases can be eliminated by a difference operation of the inter-station clock biases, and the network end can allow a relatively long convergence time before starting the PPP-RTK service.

In some embodiments of the disclosure, the network end product of the corresponding epoch includes: a resolved satellite clock bias $\tilde{dt}^s$, a linear term $\dot{\tilde{dt}}^s$ and a quadratic term $\ddot{\tilde{dt}}^s$ thereof, and a resolved satellite phase bias [|$|$|$\hat{$}$|$ [|$|$^ A\hat{T}[|$|$^g\hat{d}_j^s$. The symbol A above the parameter denotes the resolved value. However, whether the PPP-RTK user end observation stations use the linear term $\dot{\tilde{dt}}^s$ and the quadratic term $\ddot{\tilde{dt}}^s$ of the resolved satellite clock bias is determined according to the real-time requirement of the ordinary user station.

When the requirement of the ordinary user station is a near real-time time transfer result, the PPP-RTK user end observation stations do not need to use the linear term $\dot{\tilde{dt}}^s$ and the quadratic term $\ddot{\tilde{dt}}^s$ of the resolved satellite clock bias. However, if the ordinary user station needs a real-time time transfer result rather than the near-real-time time transfer result, the PPP-RTK user end observation stations need the linear term $\dot{\tilde{dt}}^s$ and the quadratic term $\ddot{\tilde{dt}}^s$ of the resolved satellite clock bias, so as to make a short-term prediction according to the delay of the satellite clock bias correction. This part will be described in detail in the relevant content of the user end later.

It should be noted that, since the satellite hardware bias changes little with time, it is not necessary to calculate its linear and quadratic terms as content items of the network end product to be provided to the user stations.

In an embodiment, when GNSS observations of three frequencies or more than three frequencies are used, the network end product further includes: a satellite code bias.

Specifically, when the value of the frequency j is greater than or equal to 3, the satellite code bias can be resolved by using the formulas (3)-(7) and represented as $\tilde{\hat{d}}_j^s$, which is also used as a content item of the network end product of the corresponding epoch.

Therefore, compared with the traditional PPP mode, the network end of the illustrated embodiment of the disclosure generates the network end product, namely a satellite clock bias product, by itself through resolving, and does not depend on the input of an external high-frequency high-precision satellite clock product. Moreover, compared with the existing RTK algorithm, the illustrated embodiment of the disclosure transfers the satellite-related product rather than a large number of observations themselves, thus relieving the pressure of data transmission.

In addition, because the network end of the illustrated embodiment of the disclosure can construct a PPP-RTK network end observation station network with hundreds of kilometers or even more than a thousand of kilometers, the ordinary user station and the high-precision time reference station can perform PPP-RTK resolutions as long as they are within the network range, thereby providing a condition of long-baseline time transfer.

S2, the high-precision time reference station using GNSS observations collected by itself and the network end product to perform a high-precision time reference station end undifferenced and uncombined PPP-RTK resolution and thereby generating multi-GNSS receiver clock biases (i.e., generally receiver clock biases corresponding to multiple GNSSs) of the high-precision time reference station, and broadcasting the generated multi-GNSS receiver clock biases of the high-precision time reference station to the ordinary user station.

In an embodiment, the high-precision time reference station using the GNSS observations collected by itself and the network end product to perform the high-precision time reference station end undifferenced and uncombined PPP-RTK resolution and thereby generate the receiver clock bias of the high-precision time reference station, includes the following sub-steps S21 through S24.

S21, based on the network end product and a network end product reference time corresponding thereto, the high-precision time reference station obtaining an estimated result or a predicted result for network end transferred satellite-related correction.

In an illustrated embodiment of the disclosure, the GNSS observations of any one of the PPP-RTK user end observation stations are received from satellite signals by the PPP-RTK user end observation station itself. What the network end transfers to the PPP-RTK user end observation stations is the network end product, i.e., the satellite-related correction, that is, satellite clock related parameters and satellite biases. This step is to obtain the estimated result or predicted result for the satellite-related correction.

If the ordinary user station needs a real-time time transfer result, the high-precision time reference station needs to obtain the predicted result of the network end transferred satellite-related correction, including a real-time satellite clock bias and a satellite phase bias required by the high-precision time reference station at a processing time. Furthermore, when GNSS observations of three frequencies or more than three frequencies are used, a satellite code bias in the three-frequency or more than three-frequency mode is also included.

Specifically, since the network end product carries a corresponding time, namely the network end product reference time; and the high-precision time reference station processing GNSS observations corresponds to a processing time. There is a certain delay between the network end product reference time and the processing time, and therefore, a difference between the two times can be calculated to obtain a delay of satellite clock bias product, expressed as $\Delta t$.

On this basis, the process of the high-precision time reference station obtaining the predicted result for the network end transferred satellite-related correction may include:

using the satellite clock bias $\tilde{dt}^s$ of time $t_j$ and the linear term $\dot{\tilde{dt}}^s$ and the quadratic term $\ddot{\tilde{dt}}^s$ thereof provided by the network end product, based on the delay $\Delta t$ of satellite clock bias product, to calculate a real-time satellite clock bias $\tilde{dt}^s(t_k)$ required by the high-precision time reference station at the processing time ($t_k=t_i+\Delta t$), as shown in formula (8) as follows.

$$\tilde{dt}^s(t_k)=\tilde{dt}^s(t_i)+\Delta t\times\dot{\tilde{dt}}^s+\Delta t^2\times\ddot{\tilde{dt}}^s \qquad (8)$$

The time $t_i$ provided in the network end product is the network end product reference time corresponding to the network end product.

Meanwhile, by using the satellite phase bias [|$]$^$$[|$]$^AÎ[|$]$^gd̂$_j^s$ of time $t_i$ provided in the network end product, the satellite phase bias [|$]$^$$[|$]$^AÎ[|$]$^gd̂$_j^s(t_k)$ at the processing time $t_k$ of the high-precision time reference station can be directly calculated, as shown in the following formula (9). Furthermore, by using the satellite code bias $\tilde{d}_j^s$ under the condition of j>2, the satellite code bias $\tilde{d}_j^s(t_k)$ at the processing time $t_k$ of the high-precision time reference station can be directly calculated, as shown in the following formula (10).

$$[|\$]\$^\$\$[|\$]\$^\hat{A}\hat{T}[|\$]\$^g\hat{d}_j^s(t_k)=[|\$]\$^\$\$[|\$]\$^\hat{A}\hat{T}[|\$]\$^g\hat{d}_j^s(t_i) \qquad (9)$$

$$\tilde{d}_j^s(t_k)=\tilde{d}_j^s(t_i) \qquad (10)$$

It can be seen that, the illustrated embodiment of the disclosure, by utilizing the PPP-RTK satellite clock bias and the phase and code bias products, can perform short-term prediction according to formulas (8)-(10) in a state of product delay. In contrast, the RTK time transfer mode cannot predict the transferred observations in a state of data delay, so that a certain delay is caused to the timeliness of time transfer.

If the ordinary user station accepts a near real-time time transfer result, the prediction is not required, and the high-precision time reference station obtains the estimated result for the network end transferred satellite-related correction. Specifically, the satellite clock bias $\tilde{dt}^s$ and the satellite phase bias [|$]$^$$[|$]$^AÎ[|$]$^gd̂$_j^s$, of time $t_i$ provided in the network end product may be directly used, and further, the satellite code bias $\tilde{d}_j^s$ under the condition of j>2 may also be used.

S22, obtaining high-precision time reference station end undifferenced and uncombined observation equations at the network end product reference time or the processing time according to the estimated result or predicted result for the network end transferred satellite-related correction obtained by the high-precision time reference station, and determining a high-precision time reference station end covariance matrix of GNSS observations at the network end product reference time or the processing time.

In order to facilitate the understanding of the following text, the prediction result obtained by the high-precision time reference station for the network end transferred satellite-related product, including the real-time satellite clock bias $\tilde{dt}^s(t_k)$, the satellite phase bias [|$]$^$$[|$]$^AÎ[|$] $^gd̂$_j^s(t_k)$ and the satellite code bias $\tilde{d}_j^s(t_k)$ under the condition of j>2 required by the high-precision time reference station at the processing time $t_k$, is taken as an example for further description.

Through the above correction, O-C terms of the undifferenced and uncombined observation equations of carrier phase $\Delta\varphi_{u,j}^s$ and pseudo-range $\Delta p_{u,j}^s$ at the time $t_k$ of the high-precision time reference station, i.e., the high-precision time reference station end undifferenced and uncombined observation equations, can be expressed as formulas (11) and (12).

$$E(\Delta\varphi_{u,j}^s+d\tilde{t}^s+[|\$]\$^\$\$[|\$]\$^\hat{A}\hat{T}[|\$]\$^g\hat{d}_j^s)=g_u^s\Delta\tau_u+d\tilde{t}_{u,g}-\mu_j\tilde{i}_u^s+\tilde{\delta}_{u,j,g}+\lambda_j\tilde{N}_{u,j}^s) \quad (11)$$

$$E(\Delta p_{u,j}^s+d\tilde{t}^s+\tilde{d}_{j>2}^s)=g_u^s\Delta\tau_u+d\tilde{t}_{u,g}+\mu_j\tilde{i}_u^s+\tilde{d}_{u,j,g} \qquad (12)$$

In formulas (11) and (12), E(•) represents the expectation operator, the superscript s of each parameter represents a satellite s, and the subscripts u, j, g represent receiver u, frequency j of the user station, and the GNSS g respectively. $\Delta\varphi_{u,j}^s$ represents carrier phase observation of the user station, $\Delta p_{u,j}^s$ represents a pseudo-range observation of the user station, $d\tilde{t}^s$ represents a recombined satellite clock bias resolved or predicted by the network end, [|$]$^$$[|$]$^AÎ[|$]$^gd̂$^s$ represents a recombined satellite phase bias solved or predicted by the network end, $\tilde{d}_{j>2}^s$ represents a recombined satellite code bias resolved or predicted by the network end, $g_u^s$ represents a mapping function of a zenith tropospheric delay $\Delta\tau_u$ projected to the signal direction for the user station, $d\tilde{t}_{u,g}$ represents a recombined receiver clock bias of the user station for the GNSS g, $\tilde{i}_u^s$ represents a recombined ionospheric delay on the first frequency band for the user station, $\mu_j=f_1^2/f_j^2$ represents the factor expanding $\tilde{i}_u^s$ to frequency j, $f_1$ represents the first frequency in a corresponding GNSS, $f_j$ represents the jth frequency in the corresponding GNSS, j is a natural number greater than 0. $\tilde{\delta}_{u,j,g}$ represents a recombined receiver phase hardware bias of the user station, $\tilde{d}_{u,j,g}$ represent a recombined receiver code hardware bias of the user station, Ai represents the wavelength on the frequency j, $\tilde{N}_{u,j}^s$ represents an integer ambiguity of the user station. It should be noted that, the same GNSS satellite orbit should be directly introduced from the outside, the user does not solve the satellite orbit. The tropospheric and ionospheric delay parameters are directly solved in formulas (11)-(12), without adding any spatial model and without relying on an atmospheric delay correction solved by the network end and the distances between network stations and the user station. The undifferenced and uncombined observation equations of the high-precision time reference station end at the network end product reference time or the processing time are referred to as the undifferenced and uncombined observation equations of the high-precision time reference station for short.

It can be understood that, for the calculation of the high-precision time reference station, the user station in the above formulas (11) and (12) refers to the high-precision time reference station, and a processing process is similar to that of the network end in the foregoing step S1.

Similar to the processing manner of the network end, the user end undifferenced and uncombined observation equations can also select an appropriate weighting function related to the elevation angle, to establish a covariance matrix of observations, i.e., obtain a covariance matrix of GNSS observations of the high-precision time reference station at the network end product reference time or the processing time as follows:

$$Q_u = \begin{pmatrix} Q_{\varphi u} & 0 \\ 0 & Q_{pu} \end{pmatrix} \quad (13)$$

In formula (13), $Q_{\varphi u}$ represents a covariance matrix of carrier phase undifferenced and uncombined observation equation of the user station, i.e., the covariance matrix for the formula (11); $Q_{pu}$ represents a covariance matrix of pseudo-range undifferenced and uncombined observation equation of the user station, i.e., the covariance matrix for formula (12). For the determination of $Q_{\varphi u}$ and $Q_{pu}$, please refer to the relevant explanation in the foregoing formula (5) for understanding; and a specific weighting function related to an elevation angle used in formula (13) can also be reasonably selected as required, and no specific limitation is made herein.

S23, based on a pre-established time constraint model of high-precision time reference station end, and high-precision time reference station end parameters containing time constraint model solved at a preceding epoch and a covariance matrix thereof, determining updated high-precision time reference station end parameters containing time constraint model and a covariance matrix thereof.

Similar to the network end, unknown parameters solved by the high-precision time reference station also have inter-epoch time constraint, and observation equations of each epoch can be established according to formulas (11)-(13). Afterwards, the time constraint model of high-precision time reference station end parameters can be established according to specific situations. Based on the high-precision time reference station end parameters $\Delta\hat{X}_{Du}(t_{k-1})$ containing time constraint model solved at the preceding epoch and the covariance matrix $Q_{\Delta\hat{X}_{Du}}(t_{k-1})$ thereof, in combination with the time constraint model of high-precision time reference station end parameters, the high-precision time reference station end parameters containing time constraint model and the covariance matrix thereof can be updated to the current epoch, as shown in the following formulas (14) and (15):

$$E(\Delta\hat{X}_{Du}(t_{k|k-1})) = \Phi_u(t_{k|k-1}) \cdot \Delta\hat{X}_{Du}(t_{k-1}) \quad (14)$$

$$Q_{\Delta\hat{X}_{Du}}(t_{k|k-1}) = \Phi_u(t_{k|k-1}) \cdot Q_{\Delta\hat{X}_{Du}}(t_{k-1}) \cdot \Phi_u^T(t_{k|k-1}) + S_u \quad (15)$$

In a near real-time mode, $t_k$ in formulas (14)-(15) may be $t_i$ instead.

In formulas (14)-(15), $\Phi_u(t_{k|k-1})$ represents an inter-epoch transfer function of time constraint of user station parameters, $\Phi_u^T(t_{k|k-1})$ is the transposition of $\Phi_u(t_{k|k-1})$. $S_u$ represents a covariance matrix of time constraint system noises among user station parameters. $\Delta\hat{X}_{Du}(t_{k-1})$ represents the part with time constraint in the unknown parameters solved by formulas (14) and (15) at the time $t_{k-1}$, that is, the parameters of high-precision time reference station end containing time constraint model solved at the preceding epoch. $\Delta\hat{X}_{Du}(t_{k|k-1})$ represents $\Delta\hat{X}_{Du}$ of the user station being updated to the time $t_k$. $Q_{\Delta\hat{X}_{Du}}(t_{k-1})$ represents the covariance matrix of $\Delta\hat{X}_{Du}$ solved at the time $t_{k-1}$ of the user station, $Q_{\Delta\hat{X}_{Du}}(t_{k|k-1})$ represents $Q_{\Delta\hat{X}_{Du}}$ of the user station being updated to the time $t_k$.

Similarly, for the calculation of the high-precision time reference station, the user station in the above formulas (14) and (15) refers to the high-precision time reference station. $\Phi_u(t_{k|k-1})$ and $S_u$ are obtained according to the pre-established time constraint model of high-precision time reference station end. Parameters with inter-epoch time constraint at the high-precision time reference station usually are $\Delta\tau_u$, $\tilde{\delta}_{u,j,g}$, $\tilde{d}_{u,j,g}$, $\tilde{N}_{u,j}^s$, and so on.

S24, solving the receiver clock bias of the high-precision time reference station, according to the undifferenced and uncombined observation equations of the high-precision time reference station end at the network end product reference time or the processing time, the high-precision time reference station end covariance matrix of GNSS observations at the network end product reference time or the processing time, and the updated high-precision time reference station end parameters containing time constraint model and their covariance matrix.

The sub-step S24 is a process of performing the high-precision time reference station end undifferenced and uncombined PPP-RTK resolution to obtain a corresponding estimated result, and the estimated result is the receiver clock bias of the high-precision time reference station of a corresponding epoch.

Similarly, a method for obtaining the corresponding estimated result in a process of the high-precision time reference station end undifferenced and uncombined PPP-RTK resolution may include: solving epoch-by-epoch using a sequential least-squares adjustment.

In particular, according to formulas (11)-(15), the sequential least-squares adjustment can be used to solve the observation equations epoch-by-epoch to obtain the receiver clock bias of the high-precision time reference station of the corresponding epoch, expressed as $\tilde{dt}_{u,g}$. The specific resolving process can refer to the related prior art for understanding, and thus will not be described in detail herein.

After solving the observation equations epoch-by-epoch by using the sequential least-squares adjustment, in an embodiment, the time transfer method further includes: resolving integer ambiguities by using a preset algorithm, and obtaining a resolution result under the IAR-enabled mode.

Specifically, the preset algorithm may be LAMBDA algorithm. In an illustrated embodiment, some or all integer ambiguities $\tilde{N}_{u,j}^s$ are resolved to integers, and are substituted into formulas (11)-(15) to obtain the receiver clock bias of the high-precision time reference station of the corresponding epoch. Likewise, using the preset algorithm to resolve the integer ambiguities is an optional way rather than a necessary step.

Similar to the network end, the convergence of solved parameters can be accelerated by correctly solving the integer ambiguities, so that the estimated result can quickly reach a relatively high precision. However, a possible wrong resolution in the integer ambiguity resolution and different numbers of ambiguities resolved in adjacent epochs may affect the stability of time parameter with which it is highly correlated, thus affecting the stability of time transfer. An ambiguity-float resolution requires relatively longer convergence time, but the estimated result has the advantage of continuity, which is an important characteristic required for time transfer.

It can be understood that, for each epoch, the receiver clock bias $\tilde{dt}_{u,g}$ of the high-precision time reference station corresponding to each GNSS can be obtained. The high-precision time reference station transfers the receiver clock biases resolved by itself to the ordinary user station, so as to complete a long-baseline high-precision real-time time transfer between the ordinary user station and the high-precision time reference station.

S3, the ordinary user station using GNSS observations collected by itself and the network end product to perform an ordinary user station end undifferenced and uncombined PPP-RTK resolution and thereby generating multi-GNSS receiver clock biases (i.e., generally receiver clock biases corresponding to multiple GNSSs) of the ordinary user station, and solving a combined inter-station clock bias between the ordinary user station and the high-precision time reference station under a combination of multiple GNSSs by using the multi-GNSS receiver clock biases of the ordinary user station and the multi-GNSS receiver clock biases of the high-precision time reference station, for time transfer.

In an embodiment, the ordinary user station using the GNSS observations collected by itself and the network end product to perform the ordinary user station end undifferenced and uncombined PPP-RTK resolution and thereby generating the multi-GNSS receiver clock biases of the ordinary user station, includes the following sub-steps S31 through S34.

S31, based on the network end product and a network end product reference time corresponding thereto, the ordinary user station obtaining an estimated result or predicted result for the network end transferred satellite-related correction.

The sub-step S31 is similar to the sub-step S21, and thus the description thereof will not be repeated herein.

S32, obtaining ordinary user station end undifferenced and uncombined observation equations at the network end product reference time or the processing time according to the estimated result or predicted result for the network end transferred satellite-related correction obtained by the ordinary user station, and a motion mode and a coordinate state of the ordinary user station; and determining an ordinary user station end covariance matrix of GNSS observations at the network end product reference time or the processing time.

In addition to the high-precision time reference station, the ordinary user station also uses the GNSS observations collected by itself and the network end product broadcast by the network end to solve the receiver clock biases of itself, and the process is basically the same as the processing manner of the high-precision time reference station. However, the only difference is that the ordinary user station needs to solve coordinates of the ordinary user station in different forms according to the motion mode and the coordinate state of the ordinary user station.

In the sub-step S32, a procedure of obtaining ordinary user station end undifferenced and uncombined observation equations at the network end product reference time or the processing time according to the estimated result or predicted result for the network end transferred satellite-related correction obtained by the ordinary user station, and a motion mode and a coordinate state of the ordinary user station, may include:

Case 1): when the ordinary user station is in a static mode and coordinates are known, fixing the coordinates of the ordinary user station and not performing a solving operation, and obtaining, as per an equation form of undifferenced and uncombined observation equations of the high-precision time reference station, first type of equations as the ordinary user station end undifferenced and uncombined observation equations at the network end product reference time or the processing time.

The high-precision time reference station end undifferenced and uncombined observation equations at the network end product reference time or the processing time can be referred to as the undifferenced and uncombined observation equations of the high-precision time reference station for short. The ordinary user station end undifferenced and uncombined observation equations at the network end product reference time or the processing time can be referred to as undifferenced and uncombined observation equations of the ordinary user station for short.

In this case, the undifferenced and uncombined observation equations of the ordinary user station as the first type of equations, are consistent with formulas (11)-(12), that is, not performing a solving operation on the coordinates of the ordinary subscriber station.

Case 2): when the ordinary user station is in the static mode and the coordinates are unknown, statically solving the coordinates of the ordinary user station, and obtaining, on the basis of the equation form of the undifferenced and uncombined observation equations of the high-precision time reference station, second type of equations as the ordinary user station end undifferenced and uncombined observation equations at the network end product reference time or the processing time.

In this case, the coordinates of the ordinary user stations need to be solved statically, that is, an infinite time constraint is added between epochs. Specifically, elements of $S_u$ corresponding coordinates in formula (15) are 0, i.e., system noises are 0.

Case 3): when the ordinary user station is in a dynamic mode and the coordinates are unknown, dynamically solving the coordinates of the ordinary user station, and obtaining, on the basis of the equation form of the undifferenced and uncombined observation equations of the high-precision time reference station, the second type of equations as the ordinary user station end undifferenced and uncombined observation equations at the network end product reference time or the processing time.

In this case, the coordinates of the ordinary user station need to be solved dynamically, that is, no time constraint is added between epochs. Specifically, there is no coordinate parameter contained in formula (15).

For the above cases 2) and 3), the ordinary user station end undifferenced and uncombined observation equations at the network end product reference time or the processing time, i.e., the second type of equations, can be expressed as:

$$E(\Delta\varphi_{v,j}{}^s + d\tilde{t}^s + [|\$]\$\^\$\$[|\$]\$\^ A\hat{T}[|\$]\$\^ g\hat{d}_j{}^s) = (G_v{}^s)^T \Delta x_v + g_v{}^s \Delta\tau_v + d\tilde{t}_{v,g} - \mu_j \tilde{\iota}_v{}^s(\text{≠}\text{⊕})_{j,g} + \lambda_j \tilde{N}_{v,j}{}^s$$

$$E(\Delta p_{v,j}{}^s + d\tilde{t}^s + \hat{d}_{j>2}{}^s) = (G_v{}^s)^T \Delta x_v + g_v{}^s \Delta\tau_v + d\tilde{t}_{v,g} + \mu_j \tilde{\iota}_v{}^s + \tilde{d}_{v,j,g} \quad (17)$$

In formulas (16)-(17), $E(\cdot)$ represents the expectation operator, the superscript s represents satellite s, and the subscripts v, j, g represent receiver v and frequency j of the ordinary user station, and the GNSS g respectively. $\Delta\varphi_{v,j}{}^s$ represents a carrier phase observation of the ordinary user station, $\Delta p_{v,j}^s$ represents a pseudo-range observation of the ordinary user station, $\tilde{dt}^s$ represents a recombined satellite clock bias resolved or predicted by the network end, [|$] $^$$[|$]$^A\hat{T}[|$]$^g\hat{d}_j^s$ represents a recombined satellite phase bias resolved or predicted by the network end, $\hat{d}_{j>2}^s$ represents a recombined code bias resolved or predicted by the network end, $G_v^s$ represents a partial derivative of an observation with respect to three-dimensional coordinates of the ordinary user station, $(G_v^s)^T$ represents the transposition of $G_v^s$, $\Delta x_v$ represents a three-dimensional coordinate increment of the ordinary user station v, $g_v^s$ represents a mapping function of a zenith tropospheric delay $\Delta \tau_v$ projected to the signal direction for the ordinary user station, $\tilde{dt}_{v,g}^s$ represents a recombined receiver clock bias of the ordinary user station for the GNSS g, $\tilde{i}_v^s$ represents a recombined ionospheric delay on the first frequency band for the ordinary user station, $\mu_j = f_1^2/f_j^2$ represents an factor expanding $\tilde{\tau}_v^s$ to frequency j, $f_1$ represents the first frequency in a corresponding GNSS, $f_j$ represents the jth frequency in the corresponding GNSS, j is a natural number greater than 0. $\tilde{\delta}_{v,j,g}$ represents a recombined receiver phase hardware bias of the ordinary user station, $\tilde{d}_{v,j,g}$ represent a recombined receiver code hardware bias of the ordinary user station, $\lambda_j$ represents the wavelength on the frequency j, $\tilde{N}_{v,j}^s$ represents an integer ambiguity of the ordinary user station.

Likewise, similar to the high-precision time reference station, the undifferenced and uncombined observation equations of the ordinary user station can also select an appropriate weighting function related to the elevation angle, to establish a covariance matrix of observations, i.e., obtain an ordinary user station end covariance matrix of GNSS observations the at the network end product reference time or the processing time, expressed as follows:

$$Q_v = \begin{pmatrix} Q_{\varphi v} & 0 \\ 0 & Q_{pv} \end{pmatrix} \quad (18)$$

In formula (18), $Q_{\varphi v}$ represents a covariance matrix of carrier phase undifferenced and uncombined observation equation of the ordinary user station, i.e., the covariance matrix for formula (16); $Q_{pv}$ represents a covariance matrix of pseudo-range undifferenced and uncombined observation equation of the ordinary user station, i.e., the covariance matrix for formula (17).

For details, please refer to the content associated with the foregoing sub-step S22 for understanding.

S33, based on a pre-established time constraint model of ordinary user station end, and ordinary user station end parameters containing time constraint model solved at the preceding epoch and a covariance matrix thereof, determining updated ordinary user station end parameters containing time constraint model and a covariance matrix thereof.

Similar to the sub-step S23, unknown parameters solved by the ordinary user station in S33 also have inter-epoch time constraint, and the ordinary user station end parameters containing time constraint model and the covariance matrix thereof can be updated to the current epoch, as shown in the following formulas (19)-(20):

$$E(\Delta \hat{X}_{Dv}(t_{k|k-1})) = \Phi_v(t_{k|k-1}) \cdot \Delta \hat{X}_{Dv}(t_{k-1}) \quad (19)$$

$$Q_{\Delta \hat{X}_{Dv}}(t_{k|k-1}) = \Phi_v(t_{k|k-1}) \cdot Q_{\Delta \hat{X}_{Dv}}(t_{k-1}) \cdot \Phi_v^T(t_{k|k-1}) + S_v \quad (20)$$

In a near real-time mode, $t_k$ in formulas (19)-(20) may be $t_j$ instead.

In formulas (19)-(20), $\Phi_v(t_{k|k-1})$ represents an inter-epoch transfer function of time constraint of ordinary user station parameters, $\Phi_v^T(t_{k|k-1})$ is the transposition of $\Phi_v(t_{k|k-1})$. $S_v$ represents a covariance matrix of time constraint system noises among ordinary user station parameters. $\Delta \hat{X}_{Dv}(t_{k-1})$ represents the part with time constraint in the unknown parameters of the ordinary user station solved by formulas (16) and (17) at the time $t_{k-1}$, $\Delta \hat{X}_{Dv}(t_{k|k-1})$ represents $\Delta \hat{X}_{Dv}$ of the ordinary user station being updated to the time $t_k$. $Q_{\Delta \hat{X}_{Dv}}(t_{k-1})$ represents the covariance matrix of $\Delta \hat{X}_{Dv}$ of the ordinary user station solved at the time $t_{k-1}$, $Q_{\Delta \hat{X}_{Dv}}(t_{k|k-1})$ represents $Q_{\Delta \hat{X}_{Dv}}$ of the ordinary user station being updated to the time $t_k$. Parameters with inter-epoch time constraint at the ordinary user station usually are $\Delta \tau_v$, $\tilde{\delta}_{v,j,g}$, $\tilde{d}_{v,j,g}$, $\tilde{N}_{v,j}^s$, and so on. $\Phi_v(t_{k|k-1})$ and $S_v$ are obtained according to the pre-established time constraint model of ordinary user station end. In the case 2) of statically solving the coordinates, the system noise of the coordinate time constraint in $S_v$ is 0. In the case 3) of dynamically solving the coordinates, the coordinates have no time constraint, and there is no coordinate parameter in formulas (19)-(20).

For details, please refer to the content associated with the foregoing sub-step S23 for understanding.

S34, solving the receiver clock bias of the ordinary user station, according to undifferenced and uncombined observation equations of the ordinary user station end at the network end product reference time or the processing time, the ordinary user station end covariance matrix of GNSS observations at the network end product reference time or the processing time, and the updated ordinary user station end parameters containing time constraint model and their covariance matrix.

Likewise, the sub-step S34 is a process of performing the ordinary user station end undifferenced and uncombined PPP-RTK resolution to obtain a corresponding estimated result, and the estimated result is the receiver clock bias of the ordinary user station of a corresponding epoch.

Similar to the sub-step S24, a method for obtaining the corresponding estimated result in a process of the ordinary user station end undifferenced and uncombined PPP-RTK resolution may include: solving epoch-by-epoch using a sequential least-squares adjustment.

Specifically, according to formulas (16)-(20), the sequential least-squares adjustment can be used to solve the observation equations epoch-by-epoch to obtain the receiver clock bias of the ordinary user station of the corresponding epoch, expressed as $\tilde{dt}_{v,g}$. The specific resolving process can refer to the related prior art for understanding, and thus will not be described in detail herein.

After solving the observation equations epoch-by-epoch by using the sequential least-squares adjustment, in an embodiment, the time transfer method further includes: resolving integer ambiguities by using a preset algorithm, and obtaining a resolution result under the IAR-enabled mode.

In particular, the preset algorithm may be LAMBDA algorithm. In an illustrated embodiment, the integer ambiguities $\tilde{N}_{v,j}^s$ are resolved to integers, and are substituted into formulas (16)-(20) to obtain the receiver clock bias of the ordinary user station of the corresponding epoch. Likewise, using the preset algorithm to resolve the integer ambiguities is an optional way rather than a necessary step.

It can be understood that, for each epoch, the receiver clock bias $\tilde{dt}_{v,g}$ of the ordinary user station corresponding to each GNSS can be obtained.

What needs to be additionally described is that, as to the receiver clock bias $d\tilde{t}_{u,g}$ of the high-precision time reference station of a corresponding epoch and the receiver clock bias $d\tilde{t}_{v,g}$ of the ordinary user station of the corresponding epoch, which are solved by the corresponding steps of S2 and S3 in the foregoing description, under a situation that no time constraint is added to the receiver hardware biases, the solved receiver clock biases each contain a time-varying inter-station code ionosphere-free (IF) combined bias. When $d\tilde{t}_{u,g}$ is taken as an example, an expression is as follows:

$$E(d\tilde{t}_{u,g}(t_k))=dt_{1u}(t_k)+d_{1u,IF,g}(t_k) \tag{21}$$

where, $d\tilde{t}_{u,g}(t_k)$ represents a solved recombined receiver clock bias of the high-precision time reference station at the time $t_k$, $dt_{1u}(t_k)$ represents a receiver clock bias at the time $t_k$ between the high-precision time reference station and one network reference station (denoted by the subscript of 1) of all the GNSS reference stations, $d_{1u,IF,g}(t_k)$ represents a code ionosphere-free combined bias at the time $t_k$ between the high-precision time reference station and the network reference station.

Considering an influence of the time-varying receiver code hardware bias on the clock bias estimated result, in a preferred embodiment, time constraints are added to the receiver hardware biases when solving at the network end and the user end, so that an expected value of the solved receiver clock bias $d\tilde{t}_{u,g}^s$ of the user end is as shown in the following formula (22).

In the case of adding time constraints to the receiver hardware biases, the solved user end clock bias containing an inter-station code ionosphere-free (IF) combined bias of the first epoch is expressed as:

$$E(d\tilde{t}_{u,g}(t_k))=dt_{1u}(t_k)+d_{1u,IF,g}(t_1) \tag{22}$$

where, $d_{1u,IF,g}(t_1)$ represents the code ionosphere-free combined bias between the high-precision time reference station and the network reference station at the first epoch.

After the receiver clock bias $d\tilde{t}_{u,g}$ of the high-precision time reference station of the corresponding epoch and the receiver clock bias $d\tilde{t}_{v,g}$ of the ordinary user station of the corresponding epoch are solved, in an embodiment, the solving a combined inter-station clock bias between the ordinary user station and the high-precision time reference station under a combination of multiple GNSSs by using the receiver clock biases of the ordinary user station and the receiver clock biases of the high-precision time reference station, includes the following steps.

① for each GNSS, performing a difference operation on the receiver clock bias of the ordinary user station corresponding to the GNSS and the receiver clock bias of the high-precision time reference station to obtain an inter-station clock bias corresponding to the GNSS.

taking u to represent the high-precision time reference station and v to represent the ordinary user station. For each GNSS, $d\tilde{t}_{u,g}$ and $d\tilde{t}_{v,g}$ may be performed with a difference operation to solve the inter-station clock bias of u and v. Adding a time constraint between hardware biases is taken as an example, a calculation formula is as follows:

$$E(d\tilde{t}_{v,g}(t_k)-d\tilde{t}_{u,g}(t_k))=E(d\tilde{t}_{uv,g}(t_k))-dt_{uv}(t_k)+d_{uv,IF,g}(t_1) \tag{23}$$

where, $d\tilde{t}_{v,g}(t_k)$ represents the receiver clock bias of the ordinary user station at the time $t_k$ for the GNSS g, $d\tilde{t}_{u,g}(t_k)$ represents the receiver clock bias of the high-precision time reference station at the time $t_k$ for the GNSS g, $d\tilde{t}_{uv,g}(t_k)$ represents the inter-station clock bias at the time $t_k$ between the ordinary user station and the high-precision time reference station for the GNSS g, $dt_{uv}(t_k)$ represents a real inter-station clock bias between the ordinary user station and the high-precision time reference station at the time $t_k$, and $d_{uv,IF,g}(t_1)$ represents the ionosphere-free code bias of the GNSS g between the ordinary user station and the high-precision time reference station at the first epoch.

The time transfer between the ordinary user station v and the high-precision time reference station u can be preliminarily completed through formula (23).

② combining the inter-station clock biases corresponding to the multiple GNSSs by using weighting factors of the multiple GNSSs, to obtain the combined inter-station clock bias.

Since multiple GNSSs are used in the PPP-RTK resolution in the illustrated embodiment of the disclosure, the inter-station clock bias $d\tilde{t}_{uv,g}(t_k)$ between the high-precision time reference station and the ordinary user station can be solved for each GNSS, so as to obtain n number of inter-station clock biases, n is the number of the multiple GNSSs participating in the resolution.

Considering that the real clock bias $dt_{uv}(t_k)$ between the high-precision time reference station and the ordinary user station does not change with the change of GNSS, the inter-station clock biases of the GNSSs can be combined to reduce noise and complement each other. The combined inter-station clock bias can be expressed as:

$$d\tilde{t}_{uv}(t_k)=\Sigma_{g=1}^{n}(\alpha_g \times d\tilde{t}_{uv,g}(t_k)) \tag{24}$$

where, $\alpha_g$ represents the weighting factors of the respective GNSSs and needs to meet the following condition that:

$$\Sigma_{g=1}^{n}\alpha_g=1 \tag{25}$$

Therefore, the combined inter-station clock bias after the combination of the multiple GNSSs can be expressed as:

$$E(d\tilde{t}_{uv}(t_k))=dt_{uv}(t_k)+\Sigma_{g=1}^{n}(\alpha_g \times d_{uv,IF,g}(t_1)) \tag{26}$$

It can be seen from formula (26), the result is still the sum of the real inter-station clock bias $dt_{uv}(t_k)$ and a constant hardware bias. The combined inter-station clock bias can be finally used for the time transfer between the ordinary user station v and the high-precision time reference station u, which will not be described in detail herein.

It should be noted that, in the near real-time mode, the $t_k$ in the above formulas (21)-(26) can be $t_i$ instead.

The illustrated embodiments of the disclosure use an undifferenced and uncombined PPP-RTK mode, combine the advantages of PPP and RTK time transfers, overcomes respective disadvantages of PPP and RTK time transfers, and thus provides a new solution and method for the long-baseline real-time high-precision time transfer. The undifferenced and uncombined PPP-RTK employed by the embodiments of the disclosure can construct a regional ground station network in a range of hundreds of kilometers or even more than a thousand of kilometers, and a difference operation is not used to eliminate parameters, so that the time transfer is suitable for long baselines. Compared with the traditional PPP mode, the network end of the embodiments of the disclosure generates by itself a network end product by resolving, namely generates satellite clock bias and satellite phase bias products, and does not depend on an input of an external high-frequency high-precision satellite clock product, the embodiments of the disclosure merely need a relatively precise orbit and can obtain the network end product by short-term prediction of the precise orbit. Moreover, the PPP-RTK method disclosed by the embodiments of the disclosure solves various atmospheric delay parameters independently in an undifferenced and uncombined model, and can deploy a certain number of GNSS reference stations within a range of around a thousand of kilometers, and thus is more suitable for long-baseline than the RTK time transfer method. In addition, compared with RTK, according to the embodiments of the disclosure, what are transferred to the high-precision time reference station and the ordinary user station are the satellite-related product rather than observations themselves, so that the data transmission pressure is relieved, and the prediction under a product delay is facilitated. Therefore, compared with the prior art, the embodiments of the disclosure can effectively realize a long-baseline real-time high-precision time transfer.

Furthermore, in the embodiments of the disclosure, the high-precision time reference station is used as one of user stations, and a difference operation is performed on the receiver clock biases of the high-precision time reference station and the ordinary user station, so that the influence brought by the network end product can be partially eliminated, and the stability of time transfer is improved. In addition, the combination of the inter-station clock biases among systems under the condition of multiple GNSSs can realize the effect of stabilities of the clock bias estimated results being complementary to each other.

In order to verify the effectiveness of the time transfer method according to the illustrated embodiments of the disclosure, an example of a long-baseline PPP-RTK time transfer experimental result in a real-time mode will be described below.

The experiment uses fifteen continuously operating reference stations (CORS) located in Europe as the GNSS reference stations of the illustrated embodiment of the disclosure, to construct a ground station network with a range of nearly one thousand kilometers as the PPP-RTK network end observation station network, and GPS and Galileo dual-frequency observations of the ground station network are used for PPP-RTK resolution to provide the network end product. Referring to FIG. 2, which illustrates a schematic distribution of the PPP-RTK network end observation station network and the PPP-RTK user end observation stations in the experiment according to an exemplary embodiment of the disclosure. Network stations in the PPP-RTK network end observation station network are denoted by dots in FIG. 2. Moreover, FIG. 2 also uses five-pointed stars to denote the PPP-RTK user end observation stations for time transfer, for example, the IGS stations BRUX and ONSA each externally connected to a hydrogen maser, which are used as the high-precision time reference station and the ordinary user station in the illustrated embodiment of the disclosure, and the two user stations are called users for short in FIG. 2. The two user stations are about 884 km apart, forming a long baseline that can be used for time comparison result detection.

Under the condition that the network end estimated results continuously run to convergence, the illustrated embodiment of the disclosure selects the estimated results of the high-precision time reference station and the ordinary user station from 21:00 on May 5, 2022 (GPST) to 21:00 on May 6, 2022 for time comparison, and the French CNES real-time GNSS orbits were used. This time period spans the O'clock on May 6, indicating that there is no obvious abnormality in the span-day calculation results. When the inter-station clock biases of multiple GNSSs are combined, the weighting factors of GPS and Galileo are respectively selected as 0.5 in the experiment of the illustrated embodiment of the disclosure. GPST refers to the GPS Time.

Figure 3:
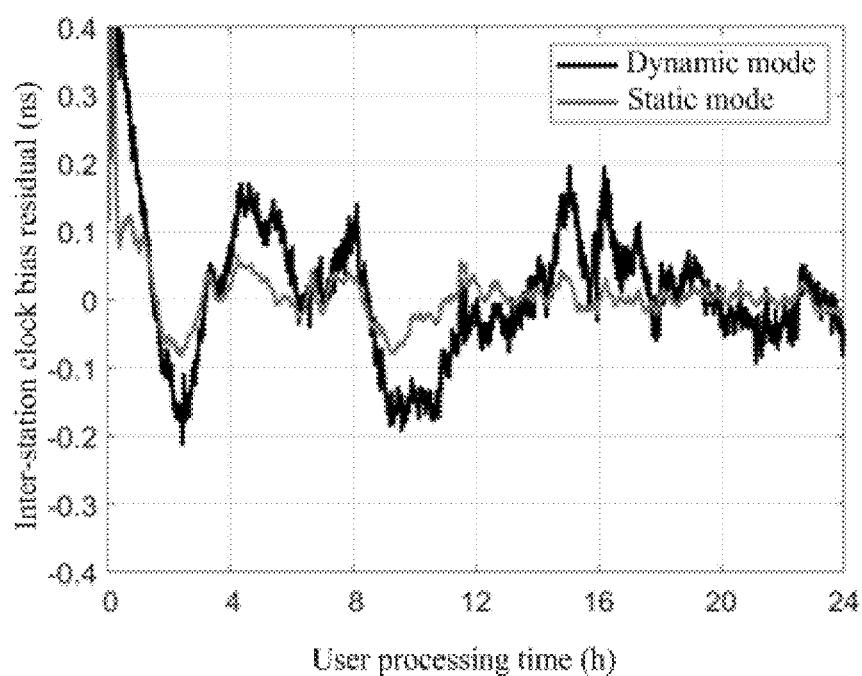
FIG. 3 illustrates a schematic diagram of inter-station clock bias residuals of 24-hour combination of BRUX and ONSA stations from 21:00 (GPST, global positioning system time) on May 5, 2022 to 21:00 on May 6, 2022 in the experiment according to an embodiment of the disclosure.

The results are shown in FIG. 3, and FIG. 3 illustrates a schematic diagram of inter-station clock bias residuals of 24-hour combination of BRUX and ONSA stations from 21:00 (GPST) on May 5, 2022 to 21:00 on May 6, 2022 in the experiment of the illustrated embodiment of the disclosure. The horizontal axis represents a user processing time, and the unit is hour (h); the vertical axis represents the inter-station clock bias residual, herein represents the combined inter-station clock bias residual, and the unit is nanosecond (ns). FIG. 3 shows the combined clock bias residuals of 24 hours of the two user stations BRUX and ONSA after removing a quadratic polynomial, and the solving of the quadratic term starts from 1 hour after the operation of the user stations to avoid the impact of convergence process. The dynamic and static modes are indicated by black and grey lines, respectively. As shown in FIG. 3, the static mode is significantly better than the dynamic mode in terms of both convergence speed and stability. After removing the first hour in the convergence phase, the single-day standard deviation (STD) reaches about 0.08 and 0.03 nanoseconds in the dynamic and static modes, respectively. The experiment shows that using the real-time satellite orbits and real-time mode results, the long-baseline of 800 to 900 kilometers has a good real-time time transfer effect. In the static mode, the single-day STD of two static stations connected with hydrogen masers reaches 0.03 nanoseconds. The time transfer method provided by the embodiments of the disclosure is verified to be effective in the aspect of long-baseline real-time high-precision time transfer.

The above description is only preferred embodiments of the disclosure, and is not intended to limit the scope of protection of the disclosure. Any modification, equivalent substitution, improvement and the like within the spirit and principle of the disclosure are included in the scope of protection of the disclosure.

What is claimed is:

1. A time transfer method based on undifferenced and uncombined precise point positioning—real-time kinematic positioning (PPP-RTK), applied in a pre-established time transfer system, wherein the time transfer system comprises a PPP-RTK network end observation station network and PPP-RTK user end observation stations, the PPP-RTK network end observation station network has a service range of more than five hundred kilometers and comprises global navigation satellite system (GNSS) reference stations and a network data processing center, and the PPP-RTK user end observation stations comprise a high-precision time reference station and an ordinary user station; the time transfer method comprising:
   the network data processing center acquiring GNSS observations collected by the GNSS reference stations, performing a network end undifferenced and uncombined PPP-RTK resolution on the GNSS observations to generate a network end product, and broadcasting the network end product to the PPP-RTK user end observation stations; wherein the GNSS observations comprise carrier phase and pseudo-range observations, and the network end product comprises estimated satellite clock bias and satellite phase bias related products;

the high-precision time reference station using GNSS observations collected by itself and the network end product to perform a high-precision time reference station end undifferenced and uncombined PPP-RTK resolution and thereby generate multi-GNSS receiver clock biases of the high-precision time reference station, and broadcasting the multi-GNSS receiver clock biases of the high-precision time reference station to the ordinary user station;

the ordinary user station using GNSS observations collected by itself and the network end product to perform an ordinary user station end undifferenced and uncombined PPP-RTK resolution and thereby generate multi-GNSS receiver clock biases of the ordinary user station, and solving a combined inter-station clock bias between the ordinary user station and the high-precision time reference station under a combination of multiple GNSSs by using the multi-GNSS receiver clock biases of the ordinary user station and the multi-GNSS receiver clock biases of the high-precision time reference station, for time transfer;

wherein the high-precision time reference station using GNSS observations collected by itself and the network end product to perform a high-precision time reference station end undifferenced and uncombined PPP-RTK resolution and thereby generate multi-GNSS receiver clock biases of the high-precision time reference station comprises:

based on the network end product and a corresponding network end product reference time, the high-precision time reference station obtaining an estimated result or a predicted result for a network end transferred satellite-related correction;

obtaining, according to the estimated result or predicted result for the network end transferred satellite-related correction obtained by the high-precision time reference station, high-precision time reference station end undifferenced and uncombined observation equations at the network end product reference time or a processing time, and determining a high-precision time reference station end covariance matrix of GNSS observations at the network end product reference time or the processing time;

based on a pre-established high-precision time reference station end time constraint model, and high-precision time reference station end parameters containing time constraint model solved at a preceding epoch and their covariance matrix, determining updated high-precision time reference station end parameters containing time constraint model and their covariance matrix;

solving the multi-GNSS receiver clock bias of the high-precision time reference station, according to the high-precision time reference station end undifferenced and uncombined observation equations at the network end product reference time or the processing time, the high-precision time reference station end covariance matrix of GNSS observations at the network end product reference time or the processing time, and the updated high-precision time reference station end parameters containing time constraint model and their covariance matrix; and wherein the ordinary user station using GNSS observations collected by itself and the network end product to perform an ordinary user station end undifferenced and uncombined PPP-RTK resolution and thereby generate multi-GNSS receiver clock biases of the ordinary user station comprises:

based on the network end product and the corresponding network end product reference time, the ordinary user station obtaining an estimated result or a predicted result for the network end transferred satellite-related correction;

obtaining, according to the estimated result or predicted result for the network end transferred satellite-related correction obtained by the ordinary user station, and a motion mode and a coordinate state of the ordinary user station, ordinary user station end undifferenced and uncombined observation equations at the network end product reference time or the processing time; and determining an ordinary user station end covariance matrix of GNSS observations at the network end product reference time or the processing time;

based on a pre-established ordinary user station end time constraint model, and ordinary user station end parameters containing time constraint model solved at the preceding epoch and their covariance matrix, determining updated ordinary user station end parameters containing time constraint model and their covariance matrix;

solving the multi-GNSS receiver clock biases of the ordinary user station, according to the ordinary user station end undifferenced and uncombined observation equations at the network end product reference time or the processing time, the ordinary user station end covariance matrix of GNSS observations at the network end product reference time or the processing time, and the updated ordinary user station end parameters containing time constraint model and their covariance matrix.

2. The time transfer method based on undifferenced and uncombined PPP-RTK according to claim 1, wherein the performing a network end undifferenced and uncombined PPP-RTK resolution on the GNSS observations to generate a network end product comprises:

obtaining network end undifferenced and uncombined original observation equations according to the GNSS observations as acquired;

selecting target singularity-basis (S-basis) parameters according to a singularity-system (S-system) theory to recombine unknown parameters in the network end undifferenced and uncombined original observation equations to avoid rank deficiencies among parameters and thereby obtain network end undifferenced and uncombined observation equations with recombined parameters, and determining a network end covariance matrix of GNSS observations of current epoch;

based on a pre-established network end time constraint model, and network end parameters containing time constraint model solved at a preceding epoch and their covariance matrix, determining updated network end parameters containing time constraint model and their covariance matrix;

solving the network end product of a corresponding epoch, according to the network end undifferenced and uncombined observation equations with recombined parameters, the network end covariance matrix of GNSS observations of current epoch, and the updated network end parameters containing time constraint model and their covariance matrix.

3. The time transfer method based on undifferenced and uncombined PPP-RTK according to claim 1, wherein the network end product comprises: for each satellite, an estimated satellite clock bias and its linear and quadratic terms, and an estimated satellite phase bias.

4. The time transfer method based on undifferenced and uncombined PPP-RTK according to claim 3, wherein the network end product further comprises: for each satellite, a satellite code bias when using GNSS observations of three frequencies or more than three frequencies.

5. The time transfer method based on undifferenced and uncombined PPP-RTK according to claim 1, wherein the obtaining ordinary user station end undifferenced and uncombined observation equations at the network end product reference time or the processing time according to the estimated result or predicted result for the network end transferred satellite-related correction obtained by the ordinary user station, and a motion mode and a coordinate state of the ordinary user station comprises:
fixing coordinates of the ordinary user station and not performing a solving operation when the ordinary user station is in a static mode and the coordinates are known, and obtaining, as per an equation form of undifferenced and uncombined observation equations of the high-precision time reference station, first type of equations as the ordinary user station end undifferenced and uncombined observation equations at the network end product reference time or the processing time, wherein the high-precision time reference station end undifferenced and uncombined observation equations at the network end product reference time or the processing time are referred to as the undifferenced and uncombined observation equations of the high-precision time reference station for short;
statically solving the coordinates of the ordinary user station when the ordinary user station is in the static mode and the coordinates are unknown, and obtaining, on the basis of the equation form of the undifferenced and uncombined observation equations of the high-precision time reference station, second type of equations as the ordinary user station end undifferenced and uncombined observation equations at the network end product reference time or the processing time;
dynamically solving the coordinates of the ordinary user station when the ordinary user station is in a dynamic mode and the coordinates are unknown, and obtaining the second type of equations as the ordinary user station end undifferenced and uncombined observation equations at the network end product reference time or the processing time.

6. The time transfer method based on undifferenced and uncombined PPP-RTK according to claim 1, wherein a method of obtaining corresponding estimated results in processes of the network end undifferenced and uncombined PPP-RTK resolution, the high-precision time reference station end undifferenced and uncombined PPP-RTK resolution and the ordinary user station end undifferenced and uncombined PPP-RTK resolution comprises:
solving epoch by epoch using a sequential least-squares adjustment.

7. The time transfer method based on undifferenced and uncombined PPP-RTK according to claim 6, wherein after solving epoch by epoch using the sequential least-squares adjustment to solve results of parameters, the time transfer method further comprises:
resolving integer ambiguities by using a preset algorithm, and obtaining a resolution result under an integer ambiguity resolution enabled mode.

8. The time transfer method based on undifferenced and uncombined PPP-RTK according to claim 1, wherein the solving a combined inter-station clock bias between the ordinary user station and the high-precision time reference station under a combination of multiple GNSSs by using the multi-GNSS receiver clock biases of the ordinary user station and the multi-GNSS receiver clock biases of the high-precision time reference station comprises:
for each of the multiple GNSSs, performing a difference operation on a receiver clock bias of the ordinary user station corresponding to the GNSS and a receiver clock bias of the high-precision time reference station corresponding to the GNSS, to obtain an inter-station clock bias corresponding to the GNSS;
combining the inter-station clock biases corresponding to the multiple GNSSs by using weighting factors of the multiple GNSSs, to obtain the combined inter-station clock bias.

9. A time transfer method based on undifferenced and uncombined precise point positioning—real-time kinematic positioning (PPP-RTK), applied in a pre-established time transfer system, wherein the time transfer system comprises a PPP-RTK network end observation station network and PPP-RTK user end observation stations, the PPP-RTK network end observation station network has a service range of more than five hundred kilometers and comprises global navigation satellite system (GNSS) reference stations and a network data processing center, and the PPP-RTK user end observation stations comprise a high-precision time reference station and an ordinary user station; the time transfer method comprising:
the network data processing center acquiring GNSS observations collected by the GNSS reference stations, performing a network end undifferenced and uncombined PPP-RTK resolution on the GNSS observations to generate a network end product, and broadcasting the network end product to the PPP-RTK user end observation stations; wherein the GNSS observations comprise carrier phase and pseudo-range observations, and the network end product comprises estimated satellite clock bias and satellite phase bias related products;
the high-precision time reference station using GNSS observations collected by itself and the network end product to perform a high-precision time reference station end undifferenced and uncombined PPP-RTK resolution and thereby generate multi-GNSS receiver clock biases of the high-precision time reference station, and broadcasting the multi-GNSS receiver clock biases of the high-precision time reference station to the ordinary user station;
the ordinary user station using GNSS observations collected by itself and the network end product to perform an ordinary user station end undifferenced and uncombined PPP-RTK resolution and thereby generate multi-GNSS receiver clock biases of the ordinary user station, and solving a combined inter-station clock bias between the ordinary user station and the high-precision time reference station under a combination of multiple GNSSs by using the multi-GNSS receiver clock biases of the ordinary user station and the multi-GNSS receiver clock biases of the high-precision time reference station, for time transfer;

wherein the solving a combined inter-station clock bias between the ordinary user station and the high-precision time reference station under a combination of multiple GNSSs by using the multi-GNSS receiver clock biases of the ordinary user station and the multi-GNSS receiver clock biases of the high-precision time reference station comprises:

for each of the multiple GNSSs, performing a difference operation on a receiver clock bias of the ordinary user station corresponding to the GNSS and a receiver clock bias of the high-precision time reference station corresponding to the GNSS, to obtain an inter-station clock bias corresponding to the GNSS;

combining the inter-station clock biases corresponding to the multiple GNSSs by using weighting factors of the multiple GNSSs, to obtain the combined inter-station clock bias.

* * * * *